(12) United States Patent
Alba et al.

(10) Patent No.: US 12,457,035 B2
(45) Date of Patent: Oct. 28, 2025

(54) METHOD FOR IDENTIFYING AND HIGHLIGHTING AVAILABLE FIBERS IN A FIBER DISTRIBUTION HUB

(71) Applicant: FRONTIER COMMUNICATIONS HOLDINGS, LLC, Dallas, TX (US)

(72) Inventors: Carlo Nino Alba, Dallas, TX (US); John Valdez, Copper Canyon, TX (US); Vincenzo Gaccetta, Dallas, TX (US)

(73) Assignee: FRONTIER COMMUNICATIONS HOLDINGS, LLC, Dallas, TX (US)

( * ) Notice: Subject to any disclaimer, the term of this patent is extended or adjusted under 35 U.S.C. 154(b) by 0 days.

(21) Appl. No.: 19/022,289

(22) Filed: Jan. 15, 2025

(65) Prior Publication Data

US 2025/0158707 A1 May 15, 2025

Related U.S. Application Data

(63) Continuation of application No. 18/605,048, filed on Mar. 14, 2024, now Pat. No. 12,224,796, which is a
(Continued)

(51) Int. Cl.
*H04B 10/25* (2013.01)
*H04B 10/079* (2013.01)
(Continued)

(52) U.S. Cl.
CPC ..... *H04B 10/0793* (2013.01); *H04B 10/0791* (2013.01); *H04B 10/25* (2013.01); *H04Q 11/0067* (2013.01); *H04B 10/25753* (2013.01)

(58) Field of Classification Search
None
See application file for complete search history.

(56) References Cited

U.S. PATENT DOCUMENTS 6,738,350 B1 * 5/2004 Gao ............... H04W 28/0289
455/452.2
8,483,562 B2 * 7/2013 Wellbrock ......... H04Q 11/0067
398/16
(Continued)

FOREIGN PATENT DOCUMENTS

AU  2008-264211 B2  6/2012
EP  1303111 A2 * 4/2003 ............ H04L 47/10
(Continued)

*Primary Examiner* — Jai M Lee
(74) *Attorney, Agent, or Firm* — MARSHALL, GERSTEIN & BORUN LLP

(57) ABSTRACT

Systems and methods for tracking fiber port availability in a fiber distribution hub are presented. An exemplary method may include: determining that a connected termination unit associated with a fiber distribution hub uses more than a predetermined threshold value of bandwidth, the connected termination unit having an association with a port of a plurality of candidate ports included in the fiber distribution hub; responsive to the determining, transmitting an indication to transfer the connected termination unit to another port of the plurality of candidate ports; and updating a fiber distribution record representative of port availability in the fiber distribution hub to indicate an updated association between the connected termination unit and the another port.

30 Claims, 9 Drawing Sheets

Related U.S. Application Data continuation of application No. 18/375,199, filed on Sep. 29, 2023, now Pat. No. 11,962,343.

(51) Int. Cl.
*H04Q 11/00* (2006.01)
*H04B 10/2575* (2013.01)

(56) References Cited

U.S. PATENT DOCUMENTS

| | | | |
|---|---|---|---|
| 8,913,549 B2 * | 12/2014 | Das | H04W 8/04 370/325 |
| 10,935,745 B1 | 3/2021 | Gay | |
| 11,295,135 B2 | 4/2022 | Brun et al. | |
| 11,340,137 B2 | 5/2022 | Leclerc et al. | |
| 11,356,177 B1 * | 6/2022 | Valdez | H04B 10/0773 |
| 11,962,343 B1 * | 4/2024 | Alba | H04B 10/25 |
| 12,224,796 B1 * | 2/2025 | Alba | H04B 10/0793 |
| 2011/0158598 A1 | 6/2011 | LeBlanc et al. | |
| 2014/0126870 A1 | 5/2014 | Landry et al. | |
| 2016/0295307 A1 | 10/2016 | Kikuzawa | |
| 2017/0212321 A1 | 7/2017 | Gronvall et al. | |
| 2017/0343755 A1 | 11/2017 | Landry et al. | |
| 2021/0018709 A1 * | 1/2021 | Berdan | G02B 6/44524 |
| 2021/0374406 A1 | 12/2021 | Brun et al. | |
| 2022/0094633 A1 * | 3/2022 | Chen | H04L 47/828 |
| 2023/0300499 A1 | 9/2023 | Kewitsch et al. | |
| 2023/0319367 A1 * | 10/2023 | Cook | H04N 21/24 |

FOREIGN PATENT DOCUMENTS

| | | |
|---|---|---|
| WO | WO-2005/050277 A2 | 6/2005 |
| WO | WO-2009/051954 A1 | 4/2009 |
| WO | WO-2021/243110 A1 | 12/2021 |

* cited by examiner

METHOD FOR IDENTIFYING AND HIGHLIGHTING AVAILABLE FIBERS IN A FIBER DISTRIBUTION HUB

CROSS REFERENCE TO RELATED APPLICATIONS

This application claims the benefit and is a continuation of U.S. patent application Ser. No. 18/605,048, titled "METHOD FOR IDENTIFYING AND HIGHLIGHTING AVAILABLE FIBERS IN A FIBER DISTRIBUTION HUB" and filed on Mar. 14, 2024, which claims the benefit and is a continuation of U.S. patent application Ser. No. 18/375,199, titled "METHOD FOR IDENTIFYING AND HIGHLIGHTING AVAILABLE FIBERS IN A FIBER DISTRIBUTION HUB" and filed on Sep. 29, 2023, the entirety of each of which is herein expressly incorporated by reference.

FIELD OF THE DISCLOSURE

This disclosure relates generally to networking systems, and, more particularly, to methods and systems within a passive optical network (PON) for identifying and indicating available fibers for additional premises in a fiber distribution hub.

BACKGROUND

A conventional PON includes one or more optical line terminals (OLTs) at a central location connecting to one or more optical last mile termination units (LMTUs) disposed at respective customer premises (e.g., physical locations serviced by the PON) via one or more optical fibers. A PON is typically implemented using a point-to-multipoint topology in which a feeder optical fiber from an OLT serves multiple last mile termination units. An LMTU may be, for example, an optical network terminal (ONT) or an optical network unit (ONU) that is optically connected to the OLT via a respective distribution optical fiber received at the LMTU. Typically, the distribution optical fibers for respective ones of the LMTUs are optically coupled to the feeder optical fiber via a fiber distribution hub (FDH) using an optical splitter. A fiber distribution terminal (FDT) may be utilized to connect feeder optical fibers to distribution optical fibers, for example.

Today, FDHs rely on manually maintained records regarding which ports are in active use and which are available for additional premises to be added. Such a reliance on manually maintained records leads to increased likelihood of human error. As such, according to conventional techniques, a database may be missing data or include inaccurate data regarding a particular port. For example, a candidate port may be incorrectly labeled in the database as available (e.g., not physically connected to a termination unit associated with a property or connected with a termination unit that is recorded as not being used or upkept). As such, a technician connecting a new termination unit may consult records, note down the candidate port, and disconnect a termination unit for a premises associated with the candidate port. However, under conventional techniques, the technician and the system are unaware of the disconnected termination unit until and unless a complaint is made regarding the disconnection. Depending on the premises, such a complaint can take hours to months and can lead to damages on the premises.

As such, when correcting for human error and/or moving to an automatically maintained recordkeeping system, errors in recordkeeping can lead to premises being accidentally disconnected from the FDH and can take hours or days to be addressed, often conventionally relying on premise-owner reporting. Further, where computerized recordkeeping is available, the available records are often spread across a number of different views, requiring a user to switch between the views to access information as needed.

SUMMARY

The systems, methods, devices, and techniques described within this disclosure are directed to systems and methods for detecting when a termination unit for a premises disconnects from a PON (e.g., when a technician removes the premises from a port that is recorded as being empty), automatically updating fiber distribution records associated with the premises, and displaying a view of the various ports in a fiber distribution hub that is updated according to and/or along with the records in real time. A user interface on a computing and/or mobile device may track and update connections between a central office and various termination units connected to the central office by way of one or more optical terminals, and may additionally provide information regarding the connection in question.

Current techniques may display information regarding a connection between the central office and various premises. However, such techniques display individual views for different information, greatly limiting the amount of information a user can receive at once and requiring additional computing to determine, update, and switch between views. Moreover, such techniques do not update the records in real time and may display inaccurate information, further exacerbating problems as discussed herein.

In some aspects, the techniques described herein relate to a method of tracking fiber port availability in a fiber distribution hub, the method including: determining, by one or more processors, that a connected termination unit associated with a fiber distribution hub uses more than a predetermined threshold value of bandwidth, the connected termination unit having an association with a port of a plurality of candidate ports included in the fiber distribution hub; responsive to the determining, transmitting, by the one or more processors, an indication to transfer the connected termination unit to another port of the plurality of candidate ports; and updating, by the one or more processors, a fiber distribution record representative of port availability in the fiber distribution hub to indicate an updated association between the connected termination unit and the another port.

In some aspects, the techniques described herein relate to a system configured to track fiber port availability in a fiber distribution hub, the system including: one or more processors; and a memory storing one or more instructions that, when executed by the one or more processors, cause the one or more processors to: determine that a connected termination unit associated with a fiber distribution hub uses more than a predetermined threshold value of bandwidth, the connected termination unit having an association with a port of a plurality of candidate ports included in the fiber distribution hub; responsive to determining that the connection termination unit uses more than the predetermined threshold value of bandwidth, transmit an indication to transfer the connected termination unit to another port of the plurality of candidate ports; and update a fiber distribution record representative of port availability in the fiber distribution hub to indicate an updated association between the connected termination unit and the another port.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples of concepts that include the claimed invention and explain various principles and advantages of those examples.

Figure 1:
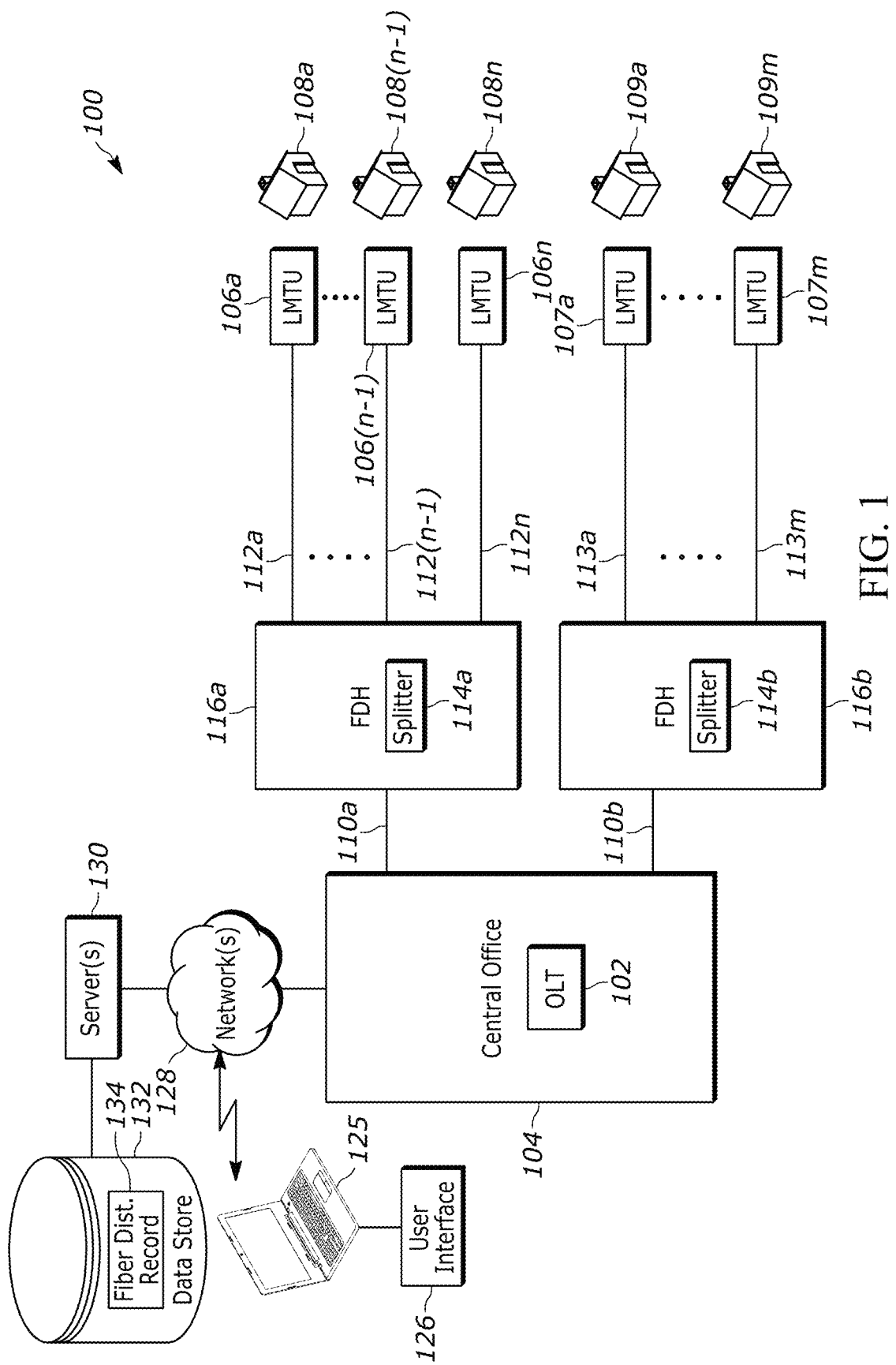
FIG. 1 is a block diagram of an example passive optical network (PON) in which the systems, methods, and/or techniques of the present disclosure may be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the present disclosure.

The apparatus and method components have been represented where appropriate by conventional symbols in the drawings, showing only those specific details that are pertinent to understanding examples of the present disclosure so as not to obscure the disclosure with details that will be readily apparent to those of ordinary skill in the art having the benefit of the description herein.

Although the figures show parts with clean lines and boundaries, some or all of these lines and/or boundaries may be idealized. In reality, the boundaries and/or lines may be unobservable, blended, and/or irregular. Use of terms such as up, down, top, bottom, side, end, front, back, etc. herein are used with reference to a currently considered or illustrated orientation. If they are considered with respect to another orientation, it should be understood that such terms must be correspondingly modified.

DETAILED DESCRIPTION

Techniques, systems, apparatuses, components, devices, and methods are disclosed for identifying and indicating fiber port availability in a fiber distribution hub (FDH). For example, a system may use a record that details elements of an FDH to determine what ports in the FDH are free. The system may subsequently detect that a termination unit (e.g., an LMTU for and/or at a premises) associated with the FDH has disconnected from the FDH and determine that the port in question is associated with the termination unit. The system may then update the record and determine a new selected port. As such, the system may automatically determine and correct errors within a fiber distribution record and accurately and quickly determine and depict a view of open and connected ports in a fiber distribution hub to a user.

A system that implements the methods described herein offers multiple benefits over conventional systems. In particular, by performing real time analysis and updating for fiber distribution records, a system implementing the methods described herein determines whether ports are available more quickly and more accurately. Moreover, the process for detecting when a termination unit is accidentally disconnected (e.g., a port that is in use is determined to be open) is faster, requires fewer resources, and reduces the time in which the termination unit (and, as such, an associated premises) in question is without power and/or communication capabilities, as conventional techniques would normally require. For example, an accidental disconnect and subsequent loss of power may be detected and corrected within seconds to minutes rather than the hours to days that may be required using conventional techniques.

Additionally, a system that implements the methods described herein may collect, collate, and display information in the fiber distribution record to a user in a single, illustrative view. In particular, the view may include key information that, in conventional techniques, is often spread around multiple views or not included at all. For example, a splitter view, a hub view, and a distribution view may normally be generated separately and as separate views rather than a comprehensive view representative of a real-world distribution of ports. Moreover, a conventional view may normally lack information associated with PON utilization, details for ports, details for customers, etc. By reflecting the real-word distribution of ports, the system and methods described herein may improve the speed and capability of a user in identifying candidate ports and/or determining what port to use for adding new termination units.

Further, by removing the need to generate additional views and/or switch between views to determine information, the techniques described herein improve the overall efficiency of the computing device running the operations described. In particular, by obviating the need to generate and/or switch between additional views, the computing device frees resources that would be needed to generate and/or store the views in question. Such resources, then, are able to be utilized for other operations, improving the overall functionality of the computing device in addition to providing increased and improved operability that standard, conventional techniques are not capable of offering.

Example Passive Optical Network (PON)

FIG. 1 is a block diagram of an example PON 100 in which the systems, methods, and techniques of the present disclosure may be implemented. The example PON 100 includes one or more optical line terminals (OLTs) (an example one of which is designated by reference numeral 102) at a central location (e.g., at a central office 104) optically connecting to one or more last mile termination units (LMTUs) 106a, . . . , 106n at respective customer premises 108a, . . . , 108n. As used herein, the term "termination unit" generally refers to a last mile termination unit (e.g., an ONU or ONT). In some implementations, the OLT 102 includes PON ports (e.g., 32 ports, 64 ports, 128 ports) each corresponding to a splitter (e.g., as detailed below) for connecting to the LMTUs by way of one or more fiber distribution hubs and/or terminals. The last mile termination units 106a, . . . , 106n may be located outside and/or inside the customer premises or premises 108a, . . . , 108n. Each last mile termination unit 106a, . . . , 106n may be, for example, an optical network unit (ONU) or an optical network terminal (ONT). In some examples herein, the term "optical terminal" generally refers to a last mile termination unit (e.g., an ONU or ONT) or an OLT.

The example PON 100 is implemented using instances of point-to-multipoint topology. For example, in the example PON 100, a first feeder optical fiber 110a from the OLT 102 (which is interchangeably referred to herein as an "F1 optical fiber 110a" or a "primary optical fiber 110a") serves the one or more last mile termination units 106a, ..., 106n via respective distribution optical fibers 112a, ..., 112n (which are interchangeably referred to herein as "F2 optical fibers 112a, ..., 112n" or "secondary optical fibers 112a, ..., 112n"). In the illustrated example, the first feeder optical fiber 110a is optically coupled to the plurality of last mile termination units 106a, ..., 106n via an example one-to-many optical splitter 114a which is disposed, located, implemented, etc. in an example fiber distribution hub (FDH) 116a. In some arrangements, the FDH 116a is located within a geographic area (e.g., a neighborhood) such that the customer premises 108a, ..., 108n are proximally close to the FDH 116a, and typically each of the customer premises 108a, ..., 108n and respective last mile termination units 106a, ..., 106n is disposed at a different optical distance from the FDH 116a. An "optical distance," as generally utilized herein, refers to a distance over which an optical signal travels or is delivered. In further implementations, the FDH 116a, 116b may include a conduit receiving a number of fibers from the OLT 102 (e.g., 124 fibers, 248 fibers, 596 fibers, etc.). The fibers may feed to the various LMTUs 106a, ..., 106n via a splitter 114a, 114b (e.g., each with 16 strands, 32 strands, 64 strands, etc.).

In implementations, the PON 100 may or may not include additional feeder optical fibers and optical splitters for a plurality of additional customer premises. Moreover, a PON may or may not include a plurality of FDHs. For example, as shown in FIG. 1, the example PON 100 includes a second feeder or primary optical fiber 110b from the OLT 102 that is optically coupled to another plurality of last mile termination units 107a-107m at respective customer premises 109a-109m via another many-to-one optical splitter 114b included in another fiber distribution hub 116b and via respective secondary optical fibers 113a-113m.

As utilized herein, the "components" of the PON 100 generally refer to the devices, nodes, and optical fibers of the PON 100. For example, the components of the PON 100 shown in FIG. 1 may include the OLT 102; the FDHs 116a, 116b; the splitters 114a, 114b; the LMTs 106a-106n, 107a-107m; and the optical fibers interconnecting the devices or nodes (e.g., the optical fibers 110a-110b, 112a-112n, and 113a-113m).

In some scenarios, an optical terminal (e.g., the OLT 102 and/or one or more of the last mile termination units 106a-106n, 107a-107m) may transmit optical test signals and/or patterns, indication light, and/or other types of measurement signals into an optical fiber in response to control signals received from a computing device. For example, the OLT 102 and/or the one or more LMTUs 106a-106n, 107a-107m may receive control signals from a computing device 125 (e.g., a laptop, a computer, a tablet, a mobile phone, etc.) associated with a service technician or other agent of the PON 100. In some examples, the computing device 125 controls an optical terminal of the PON 100 via one or more networks 128 (which may include one or more wired and/or wireless private networks and/or public networks, such as the Internet), and/or by direct interaction with the optical terminal (e.g., via a hotspot provided by the optical terminal, a service port of the optical terminal, etc., not shown in FIG. 1). Additionally and/or alternatively, control signals may be received from one or more servers 130 of the PON 100 that are used to manage the PON 100, the network(s) 128, etc. For example, the one or more servers 130 may schedule and execute diagnostics of various components of the PON 100 and/or of the PON 100 as a whole; generate alerts and alarms; initiate various actions; provide user interfaces, which may include graphical user interfaces (e.g., at the computing device 125); log, historize, and/or otherwise store data generated by and associated with the PON 100 (e.g., in one or more data stores 132); and the like. For example, one or more applications may execute at the server(s) 130 and/or the server(s) may host one or more services to provide management, administrative, and/or test functionalities of the PON 100. Additionally or alternatively, the computing device 125 may interact with the server(s) 130 using a mobile application, a web service call, a direct and wireless connection (e.g., as described above), a wired connection, etc. The computing device 125 may generate and/or display a user interface 126 associated with a fiber distribution record (e.g., fiber distribution record 134 as described below) and/or an FDH (e.g., FDH 116a, FDH 116b, etc.). Depending on the implementation, the user interface 126 may include elements representative of a physical layout of the FDH and/or as described in the fiber distribution record, as described in more detail with regard to FIGS. 2A and 2B below.

In some implementations, the server 130, computing device 125, and/or other such electronic device may monitor bandwidth at the PON ports as well as at corresponding ports of the FDH, LMTUs, or other such optical terminals. In further implementations, the server 130 may determine to move a user from a particular port to another based on the bandwidth utilization and/or indications from a customer (e.g., a customer complaint, a user indication, a system determination, etc.).

Various information and data associated with, utilized by, and/or generated by the PON 100 may be stored in the data stores 132 of the PON 100. For example, the data store(s) 132 may store records of customer contact events with a technical support organization supporting the PON 100, service call records, records of operating conditions and events which occurred, logbooks, and the like. Additionally, the data store(s) 132 may store applications which may execute at the one or more servers 130, and/or which may be downloaded or otherwise provided to the technician computing device 125 for installation and execution thereon. Further, the data store(s) 132 may store data indicative of performance, faults, diagnostics, statuses, states, and/or other data corresponding to the components of the PON 100. Still further, the data store(s) 132 may store data indicative of the architecture, infrastructure, and component connectivity of the PON 100, including identifications of various PON components and indications of which PON components connect to which other PON components. Of course, the data store(s) 132 may store any updates to any and all of the information and data stored therein.

Moreover, the data store(s) 132 include a fiber distribution record 134 representative of a particular FDH 116 (e.g., FDH 116a, FDH 116b, etc.), one or more ports in the FDH representative of one or more connections with termination units (e.g., LMTUs 106a, 106b, ..., 106n), one or more splitters 114 (e.g., splitter 114a, splitter 114b, etc.) associated with the FDH 116, etc. Further, the fiber distribution record 134 may include additional information associated with users, such as associations between various ports in the FDH and various premises, GPS data for the various premises, a status and/or type of the connection to the premises, a PSI score, a wavelength (λ) and/or attenuation rate, an identifier (e.g., a premises ID, a termination unit ID, etc.), a serial number (e.g., of an optical network terminal (ONT)), etc. Similarly, the fiber distribution record 134 may otherwise include additional information as described and/or as otherwise associated with various implementations described herein.

Example Fiber Distribution Hub Interface

Figure 2A:
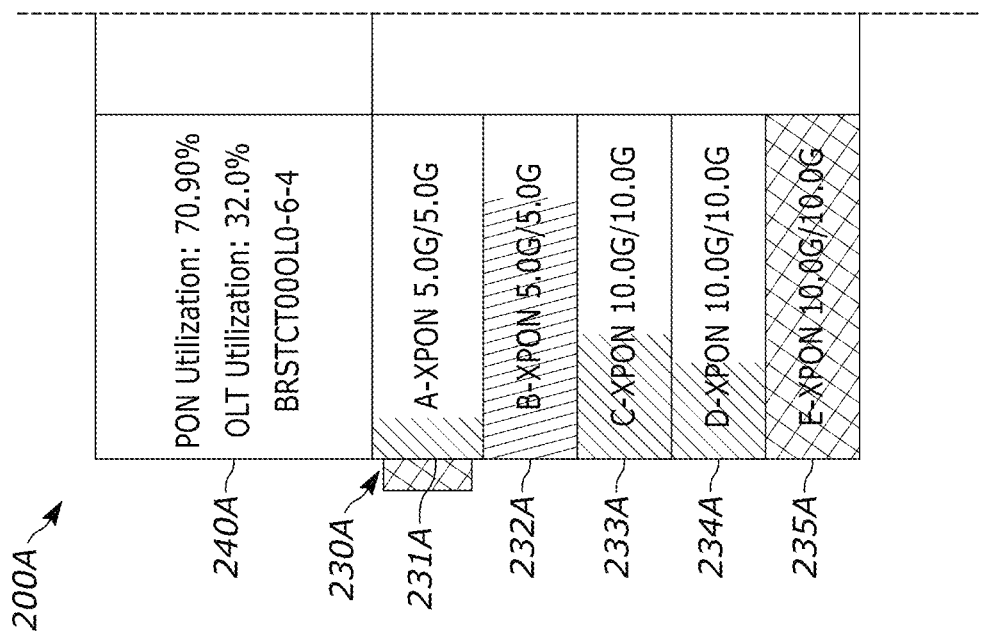
FIGS. 2A and 2B illustrate exemplary user interfaces for detecting, displaying, and updating records associated with ports of a fiber distribution hub that may be in the PON of FIG. 1, in accordance with the techniques discussed herein.
Figure 2B:
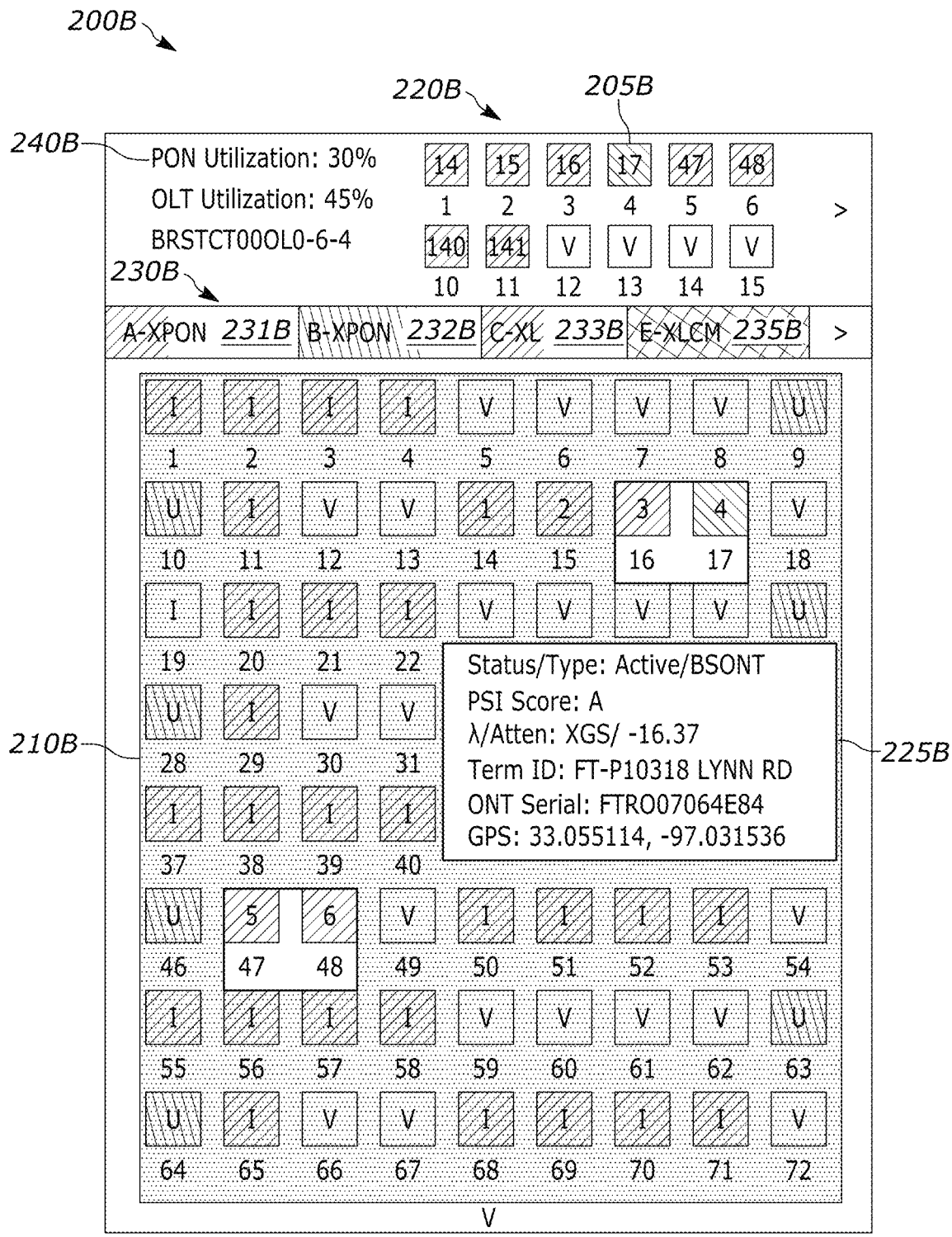

FIGS. 2A and 2B depict exemplary interfaces 200A and 200B for a fiber distribution hub (e.g., an FDH 116 of FIG. 1), which may be utilized in a passive optical network (e.g., PON 100 of FIG. 1). For case of illustration, and not for limitation purposes, the interfaces 200A and 200B are described with simultaneous reference to the PON 100. Depending on the implementation, the interfaces 200A and 200B may be or include the user interface 126 as described with regard to FIG. 1 above.

As depicted in FIGS. 2A and 2B, the exemplary interfaces 200A and 200B depict views representative of an FDH 116 (e.g., FDH 116a, FDH 116b, and/or both FDH 116a and 116b) and illustrating connections between the FDH 116 and customer premises 108a, . . . , 108n. Depending on the implementation, data regarding the interfaces 200A/200B may be stored at a server 130 and/or at a computing device or database communicatively coupled to the server 130. As such, the server 130 may configure, update, render, and/or otherwise modify the interfaces 200A/200B using data stored at the server 130 and/or one or more communicatively coupled devices (e.g., the data store(s) 132).

In some implementations, the interfaces 200A/200B include a plurality of ports 210A/210B, representative of one or more ports in the FDH 116 to connect one or more LMTUs 106a, . . . , 106n associated with one or more customer premises 108a, . . . , 108n via distribution optical fibers 112a, . . . , 112n. Depending on the implementation, the interfaces 200A/200B are configured such that the plurality of ports 210A/210B are displayed so as to mirror the associated ports in the FDH 116. For example, if an FDH includes 432 ports arranged in 18 rows of 23 ports and 1 row of 18 ports, the interfaces 200A/200B may be similarly configured to reflect 18 rows of 23 ports and 1 row of 18 ports for the plurality of ports 210A/210B. In other implementations, the interfaces 200A/200B are configured based on a display device such that the number of ports in a row is reflective of a size of the device (e.g., fitting 9 ports per row, fitting 18 ports per row, etc.).

In some implementations, the ports 210A/210B are color coded to reflect a current status of the respective ports 210A/210B. For example, in the exemplary implementations of FIGS. 2A and 2B, the ports 210A/210B are colored a first color (e.g., green) when in use (e.g., connected to an LMTU 106) and a second color (e.g., white) when vacant. In further implementations, the ports 210A/210B may be colored a third color (e.g., yellow or orange in the exemplary implementations of FIGS. 2A and 2B) when the status is unknown, an error associated with the specific port has occurred, etc. In further implementations, the ports 210A/210B may include a character and/or a symbol further representative of the FDH port status. For example, the ports in use may include an "I" for in use, an "A" for active, a "C" for connected, etc. Similarly, the vacant port may include a "V" for vacant, an "I" for inactive, a "D" for disconnected, etc., and a port with coded according to the third color may include a "U" for unknown, an "E" for error, a "?" symbol, etc. In still further implementations, a particular port 205A/205B may turn a fourth color (e.g., blue in the exemplary implementations of FIGS. 2A and 2B) in response to an interaction event from a user. Depending on the implementation, an interaction event may include a click, a touch, a voice command, a keystroke, etc.

In still further implementations, the interaction event with the particular port 205A/205B may cause the interface 200A/200B to generate and/or display a splitter view 220A/220B of one or more ports associated with a particular splitter 114 and/or channels associated with the one or more ports, including the particular port 205A/205B. In some such implementations, the splitter view 220A/220B displays any ports in use with a number corresponding to the F2 optical fiber 112 number (e.g., number 18 for the particular port 205A/205B). Similarly, the standard view of the ports 210A/210B may replace the character denoting the port is in use with a number corresponding to the splitter number (e.g., number 4 for the particular port 205A/205B). In further implementations, the vacant ports remain unchanged.

Depending on the implementation, the interface 200A/200B, particularly the ports 210A/210B and/or the splitter view 220A/220B, may reflect the physical layout of the FDH. For example, the server 130 and/or a computing device (e.g., computing device 125) may detect (e.g., from stored information in the fiber distribution record, via user input, via a wireless or wired transmission from the FDH, etc.) a model for the FDH. The computing device 125 may then generate, modify, and/or otherwise display the interface 200A/200B such that the interface 200A/200B at least partially mimics a physical layout for the FDH.

In further implementations, the interaction event with the particular port 205A/205B further causes the interface 200A/200B to generate and/or display an information window including port records 225A/225B associated with the particular port 205A/205B. Depending on the implementation, the port records 225A/225B may include a status of the particular port 205A/205B (e.g., active, inactive, unknown, etc.), a PON type for the particular port 205A/205B (e.g., start frame delimiter (SFD), end frame delimiter (EFD), no preamble, etc.), a pounds per square inch (PSI) score, a PON wavelength (λ) type (e.g., a Gigabit PON (GPON) a 10 Gigabit PON (XG-PON), a 10 Gigabit Symmetrical PON (XGS-PON), etc.), an attenuation rate, a terminal identifier, an LMTU identifier (e.g., an ONT serial number), position data for the termination unit and/or an associated premises (e.g., GPS coordinates), etc. It will be understood that the information described for the port records 225A/225B are exemplary only, and that additional or alternate information may be included, depending on the implementation. For example, the port records may include customer-specific information (e.g., a customer identifier, a contact number, etc.), premise-specific information (e.g., an address, a premise type, etc.), area-specific information, etc.

In the exemplary implementations of FIGS. 2A and 2B, the interfaces 200A/200B include a splitter utilization view 230A/230B. Depending on the implementation, the splitter utilization view 230A/230B may include particular utilization rates for each splitter (e.g., splitter utilization rates 231A/231B, 232A/232B, 233A/233B, 234A, 235A/235B (referred to as splitter utilization rates 231-235)). In some implementations, the splitter utilization rates 231-235 are color coded based on the overall utilization of each splitter. For example, the splitter utilization rates 231-235 may be a first color (e.g., green in the exemplary implementations of FIGS. 2A and 2B) as representative of low utilization rates below a predetermined lower threshold (e.g., less than 25%, less than 33%, less than 50%, etc.). Further, the splitter utilization rates 231-235 may be a second color (e.g., yellow in the exemplary implementations of FIGS. 2A and 2B) as representative of medium utilization rates above the predetermined lower threshold and below a predetermined upper threshold (e.g., between 25%-50%, between 33%-66%, between 50%-75%, etc.). In such implementations, the splitter utilization rates 231-235 may be a third color (e.g., red in the exemplary implementations of FIGS. 2A and 2B) as representative of high utilization rates above the predetermined upper threshold (e.g., more than 50%, more than 66%, more than 75%). As such, a user is able to quickly identify which splitters are near capacity when determining to which splitter to connect a termination unit of the premises 108a, . . . , 108n.

In some implementations, the splitter utilization rates 231-235 include an indication of technology capability for the splitter in question. As such, the splitter utilization rates 231-235 may include characters, shapes, symbols, and/or other such visual indicators of the splitter capabilities. For example, in the exemplary implementation of FIG. 2A, the splitter utilization rates 231-235 may include at least one of four characters (e.g., X, Q, L, and/or C) to indicate the bandwidth capabilities of the splitter in question (e.g., X represents 5/10 gigabit capability, Q represents 25 gigabit capability, L represents 50 gigabit capability, and C represents 100 gigabit capability). As such, a user quickly receives indications of different capabilities when interacting with the interfaces 200A/200B, enabling the user to determine whether a particular type of premise is suited for a splitter (e.g., a business may need 100 gigabit capability while a single person household may only need 10 gigabit capability).

In some implementations, the splitter utilization rates 231-235 additionally or alternatively include an indication of a maximum quantity being and/or to be sold to users (e.g., 5.0 G/5.0 G for splitter utilization rate 231A, 10.0 G/10.0 G for splitter utilization rate 235A, etc.). In further implementations, the OLT and/or the splitter in question may multiplex multiple fibers with the splitter utilization rates 231-235 together and provide access by way of a single splitter. As such, a user or third party (e.g., a service technician) may change an LMTU between fiber connections without requiring additional changes. In further implementations, the splitter may have a multi-dwelling connection (e.g., the multiple residences, multiple businesses, a combination of both, etc.) utilizing the different splitter utilization rates 231-235 based on needs, customer requests, purchased packages, etc.

In further implementations, the splitter utilization rates 231-235 may be or include a status bar, with part of the bar filled proportional to the splitter utilization percentage. In still further implementations, the splitter utilization rates 231-235 may include an indicator that indicates which splitter is currently displayed in the splitter view 220A/220B. In further implementations, the indicator may move responsive to user inputs (e.g., a click event, a tap event, a voice command, a drag event, etc.) and the splitter view 220A/220B may change to reflect the chosen splitter in response.

In some implementations, the interfaces 200A/200B may include an overall utilization view 240A/240B. Depending on the implementation, the overall utilization view 240A/240B may include a PON utilization rate, an OLT utilization rate, and/or other information related to the PON or OLT as a whole.

Depending on the implementation, at least some of the processing and operations described herein may occur at a user device (e.g., computing device 125). For example, the fiber distribution record may be updated at the server 130 and the server 130 may transmit the information to the computing device 125 in real time. The computing device 125 may then update the interface 200A/200B responsive to receiving the information, allowing the computing device 125 to update the interface 200A/200B repeatedly, continuously, and/or in real time. In further implementations, the computing device 125 may receive the indication of updates to the fiber distribution record in real time and may update the interface 200A/200B before or while transmitting indications of the updates to the server 130. Depending on the implementation, the computing device 125 may interact with the server 130 as described with regard to FIG. 1 above.

Figure 3:
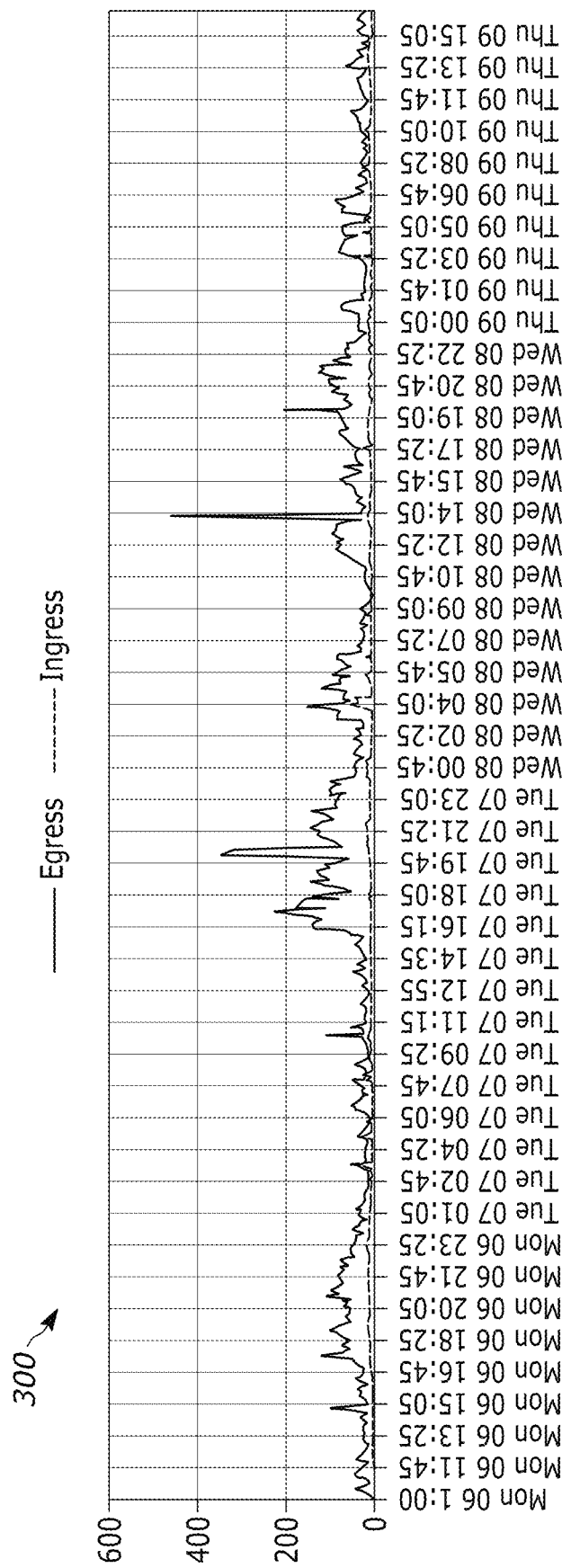
FIG. 3 illustrates an exemplary interface depicting an ingress and egress bandwidth and/or utilization of various input ports of a fiber distribution hub that may be in the PON of FIG. 1.
Figure 3:
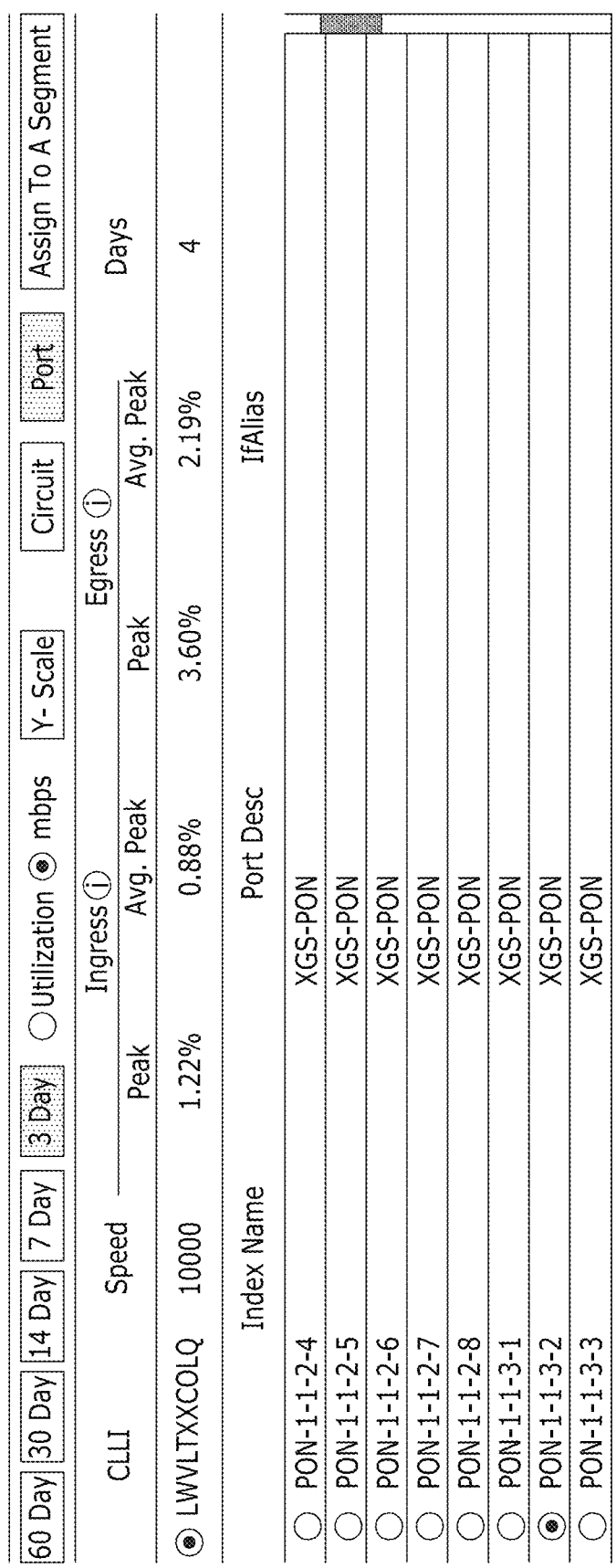

FIG. 3 depicts an exemplary interface 300 depicting a graph 305 and table 310. In some implementations, the graph 305 depicts megabits per second (mbps) and/or utilization of an ingress and/or egress bandwidth for a particular port over a period of time. Depending on the implementation, the table 310 may include an identifier (e.g., a Common Language Location Identifier (CLLI) for an LMTU, OLT, FDH, etc. along with a speed, ingress peak utilization/average peak utilization, ingress peak mbps/average peak mbps, egress peak utilization/average peak utilization, and/or egress peak mbps/average peak mbps. Moreover, the table 310 may include a listing of ports, circuits, and/or other components associated with the LMTU, OLT, FDH, etc. In further implementations, the table 310 may additionally or alternatively display a description of the port (e.g., XGS-PON, XG-PON, GPON, etc.), a user-determined alias, relevant record information associated with the port, etc. Depending on the implementation, the interface 300 may be associated with the interfaces 200A/200B, and an interaction event (e.g., a tap, a click, a swipe, interacting with a link, a voice command, etc.) with the interfaces 200A/200B may cause the interface 300 to be generated and/or displayed.

In some implementations, the interface 300 displays the egress and/or ingress bandwidth information associated with a particular port. In further such implementations, the interface 300 may display information associated with the egress and/or ingress waveform (e.g., a wavelength, source information, destination information, etc.) in addition to the mbps and/or utilization as described above.

Example Method for Identifying and Indicating Fiber Port Availability

Figure 4:
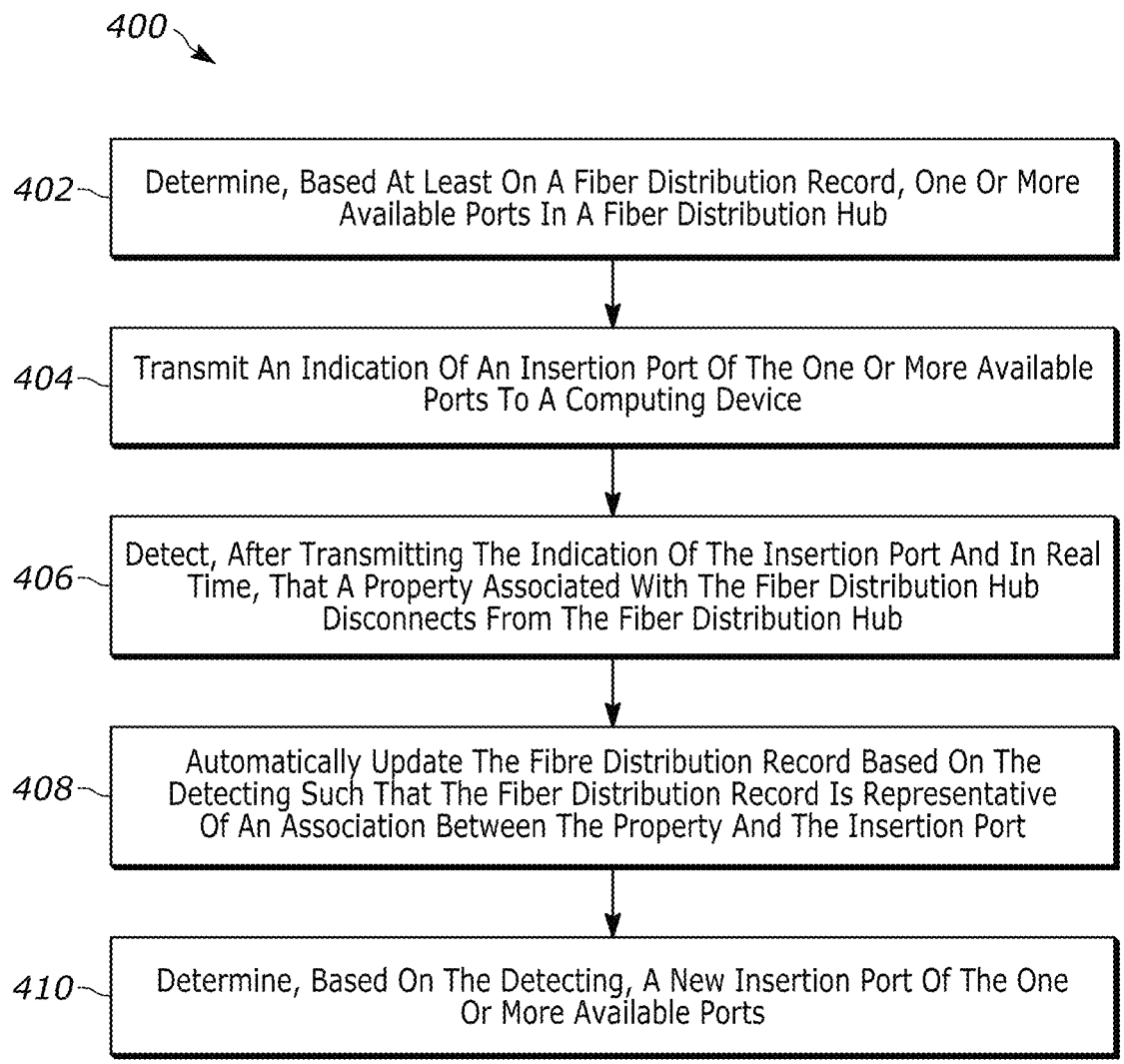
FIG. 4 depicts a flow diagram of an example method for determining whether termination units disconnect from a PON of FIG. 1 and automatically updating a record associated with the PON.

FIG. 4 depicts a flow diagram of an example method 400 for identifying and indicating fiber port availability via a passive optical network (PON). For example, instances of the method 400 may be executed via the PON 100 of FIG. 1 and/or components thereof. For case of illustration, and not for limitation purposes, the method 400 is described with simultaneous reference to the PON 100 of FIG. 1 and the example user interfaces 200A/200B depicted in FIGS. 2A/2B.

At block 402, the server 130 determines one or more candidate ports in a fiber distribution hub (FDH). In some implementations, the server 130 the candidate ports based on a fiber distribution record. In further implementations, the server 130 retrieves the fiber distribution record from the data store(s) 132. Depending on the implementation, the fiber distribution record may include associations between various ports in the FDH and various premises, GPS data for the various premises, a status and/or type of the connection to the premises, a PSI score, a wavelength ($\lambda$) and/or attenuation rate, an identifier (e.g., a premises ID, a termination unit ID, etc.), a serial number (e.g., of an optical network terminal (ONT)), etc. In some implementations, elements of the fiber distribution record are automatically determined by the server 130. For example, the server 130 may use GPS coordinates coming from a geotag, GPS transmitter, etc. and determine data associated with the termination unit and/or premises (e.g., based on a time of connection, GPS data associated with a transmitting device, etc.). In some implementations, an electronic device associated with a user (e.g., computing device 125 displaying an interface 200A or 200B) may gather and/or update GPS data at the server 130 using internal hardware. In further implementations, a user manually connects the data to a premises. Similarly, the fiber distribution record may rely on and/or include metadata associated with the termination unit and/or premises in question.

In some implementations, the fiber distribution record includes and/or is a record for each FDH and/or FDT associated with an FDH. Depending on the implementation, the fiber distribution record additionally includes GPS coordinates for the FDH and/or FDT associated with the FDH, a date of activation and/or connection, connection details with a corresponding OLT, etc. In some such implementations, the details regarding the connection between the FDH and/or FDT associated with the FDH, and the OLT remain constant and are not updated when other details for the fiber distribution record are updated (e.g., as described with regard to block 408 below). In further implementations, the details regarding the connection between the FDH and/or FDT associated with the FDH, and the OLT are updated whenever the fiber distribution records are updated. In still further implementations, such details are updated when the fiber distribution records are updated, and the details differ from what is currently stored in the record(s). In yet still further implementations, such details are updated when the server 130 determines that the details differ from what is currently stored in the record(s).

Depending on the implementation, the server 130 may determine and/or receive an indication that records regarding a connection between the FDH (and/or the FDT associated with the FDH) and the OLT is trustworthy. In some such implementations, the server 130 determines to refrain from updating records regarding the connection unless the server 130 receives an indication (e.g., from a user, from the FDH, from the OLT, etc.) that the records are incorrect. As such, the server 130 determines to update records regarding the connection between the FDH and LMTUs when a problem is detected rather than the connection between the OLT and the FDH.

At block 404, the server 130 transmits an indication of a selected port of the one or more candidate ports to a computing device (e.g., associated with user). In some implementations, the server 130 determines the selected port based on one or more parameters for the various ports (e.g., oldest port without connection, candidate port with closest premises nearby, etc.). In other implementations, the server 130 uses GPS coordinates of a user device for a technician connecting the termination unit for a premises to the FDH and/or a user device associated with the premises in question. In some such implementations, the server 130 uses the GPS coordinates to determine an LMTU (e.g., an FDT) with which to connect the premises and, based on the FDT, a candidate port in the FDH to use for connecting the termination unit. For example, a termination unit may use ports 1-6 of an FDT, which in turn may connect to ports 195-200 of an FDH.

At block 406, the server 130 detects, in real time, that a termination unit associated with the FDH has been disconnected from the FDH. Depending on the implementation, the server 130 may detect the disconnect in response to (e.g., after and/or within a predetermined time period of) transmitting the indication of the insertion point. In some implementations, the server 130 detects the disconnect due to a loss of power and/or communication from the termination unit. For example, in some such implementations, the server 130 and/or a device communicatively coupled to the server 130 monitors each port and/or each endpoint associated with a port (e.g., an LMTU and/or a premises) for loss of connection. In such implementations, the server 130 may detect when an endpoint loses connection to the FDH and determine that a termination unit associated with the FDH has been disconnected) In further implementations, the server determines, based on the detection, that the disconnect is due to a connection being removed from the FDH (e.g., from the determined selected port). Depending on the implementation, the disconnect may be or refer to a physical disconnect (e.g., a connection with the termination unit is physically removed from the FDH), signs representative of a physical disconnect (e.g., a signal received from the termination unit is below a predetermined threshold due to wear and tear in the wire, signal attenuation along the wire, a problem in the actual port or termination unit, etc.), a logical disconnect (e.g., a connection with another termination unit causing a perceived disconnect with another termination unit), and/or any other such disconnect.

At block 408, the server 130 automatically updates the fiber distribution record based on the detecting. In some such implementations, the server 130 update the fiber distribution record to reflect that the termination unit that lost connection to the FDH is associated with the previously determined selected port. In further implementations, the server 130 also transmits or causes a device communicatively coupled with the server 130 to transmit a message to a user device associated with a technician (e.g., the technician connecting a new termination unit that disconnected the other termination unit(s)). Depending on the implementation, the message may include an indication of the termination unit that was disconnected from the FDH, an indication of the port that that the termination unit was previously connected to, instructions to reconnect the termination unit that lost power, etc. In further implementations, the server 130 updates the fiber distribution record and/or transmits the message to the device in real time. In still further implementations, the server 130 notifies a user in real time and provides a prompt for the user to allow the server 130 to update the fiber distribution record and/or transmit the message to the device.

At block 410, the server 130 determines a new selected port of the one or more candidate ports. In some implementations, the server 130 determines the new selected port similarly to determining the previous selected port but excluding the previous selected port as a possibility. In further implementations, the server 130 determines the new selected port for the disconnected termination unit rather than for the new termination unit.

In some implementations, when a termination unit is initially connected to the FDH, the server 130 "backtracks" the communication path to determine details regarding the termination unit of the premises. In particular, the server 130 may receive GPS data from an LMTU and/or the premises (e.g., via an NFC tag, a geotag anchor, etc. at each location). For instance, the server 130 may obtain or crowd source GPS data or GPS information, e.g., from each location serviced by the system. The server 130 then determines a nearest FDH and/or FDT associated with an FDH, based on the GPS data (e.g., according to a physical address, the land plot, direct GPS coordinates, directions between the LMTU and/or the premises and the FDH or FDT, etc.). Depending on the implementation, the server 130 may determine that some information regarding the connection between the LMTU and the OLT is trustworthy (e.g., connection information between the OLT and the FDH and/or FDT) and, therefore, is automatically used unless the server 130 receives an indication to the contrary. In further implementations, the server 130 may determine that some information is to be confirmed, and generates a notification to a user and/or third party (e.g., a service tech on the site) to confirm GPS data, location data, etc.

The server 130 may then monitor activity between the OLT and the LMTU by way of the FDH and/or FDT. As such, the server 130 in such implementations may determine a particular port of the FDH to which the LMTU is connected. Moreover, the server 130 may then update records based on the determined port. In particular, in some such implementations, the server 130 may map the port to the premises (e.g., an address) and/or a serial number of the LMTU (e.g., as described above with regard to FIGS. 2A-3). In some implementations, the server 130 may use the above backtracking techniques to populate and/or prepopulate an FDH and/or fiber distribution records associated with the FDH.

Depending on the implementation, the server 130 may perform the backtracking additionally or alternatively when the server 130 updates the fiber distribution records, when the server 130 detects that a termination unit is disconnected, etc. As such, the server 130 may use the monitoring to detect when a termination unit disconnects from a remainder of the PON. Moreover, the server 130 may perform such operations, determinations, and/or detections without using more dangerous and/or inefficient current techniques. For example, current techniques may utilize a laser (e.g., emitted from a pin) inserted into cable connecting a premises and/or LMTU to the FDH and/or FDT. In particular, current techniques may have a user manually observe a cable exit (and/or holes in the cable) to determine where the cable leads, requiring a first user at the FDH and/or FDT and a second user near the LMTU to manually observe the process. Instead, the server 130 may monitor and/or track a connection from an OLT to an LMTU via an FDH/FDT more accurately, more safely, automatically, and without additional human intervention.

ADDITIONAL CONSIDERATIONS

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged, or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged, or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific examples have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of the disclosure. Additionally, the described examples should not be interpreted as mutually exclusive, and should instead be understood as potentially combinable if such combinations are permissive in any way. In other words, any feature disclosed in any of the aforementioned examples may be included in any of the other aforementioned examples.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus, the following claims are hereby incorporated into the Detailed Description, with each claim standing on its own as a separately claimed subject matter.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The examples are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification and the attached drawings, specific examples have been described. However, one of ordinary skill in the art appreciates that various modifications and changes can be made in view of aspects of this disclosure without departing from the scope of the disclosure as set forth in the claims below. Accordingly, the specification and figures are to be regarded in an illustrative rather than a restrictive sense, and all such modifications made in view of aspects of this disclosure are intended to be included within the scope of present teachings. Numerous alternative examples could be implemented, using either current technology or technology developed after the filing date of this patent, which would still fall within the scope of the claims. By way of example, and not limitation, the disclosure herein contemplates at least the following examples:

Example 1. A method of tracking fiber port availability in a fiber distribution hub, the method comprising: determining, by one or more processors, that a connected termination unit associated with a fiber distribution hub uses more than a predetermined threshold value of bandwidth, the connected termination unit having an association with a port of a plurality of candidate ports included in the fiber distribution hub; responsive to the determining, transmitting, by the one or more processors, an indication to transfer the connected termination unit to another port of the plurality of candidate ports; and updating, by the one or more processors, a fiber distribution record representative of port availability in the fiber distribution hub to indicate an updated association between the connected termination unit and the another port.

Example 2. The method of example 1, further comprising: generating, by the one or more processors, a fiber distribution hub display representative of the fiber distribution record; and displaying, by the one or more processors, the fiber distribution hub display to a user.

Example 3. The method of example 2, wherein updating the fiber distribution record includes: updating, by the one or more processors, the fiber distribution hub display responsive to detecting that the connected termination unit has been transferred to the another port.

Example 4. The method of example 3, further comprising: detecting, by the one or more processors, one or more changes in availability for one or more ports of the fiber distribution hub in real time; wherein the updating the fiber distribution hub display includes presenting the one or more changes in availability responsive to the detecting the one or more changes in availability.

Example 5. The method of example 2, wherein generating the fiber distribution hub display includes: generating, by the one or more processors, a respective representation for each port of a plurality of ports associated with the fiber distribution hub, wherein the respective representation for the each port is color-coded according to an availability of the each port.

Example 6. The method of example 5, further comprising: calculating, by the one or more processors, a respective utilization metric associated with at least one port of the plurality of ports associated with the fiber distribution hub; and displaying, by the one or more processors, the respective utilization metric to the user responsive to an interaction by the user with the at least one port.

Example 7. The method of example 1, further comprising: generating, by the one or more processors, a bandwidth utilization associated with a particular splitter channel, the particular splitter channel comprising one or more ports of a plurality of ports associated with the fiber distribution hub; and displaying, by the one or more processors, the bandwidth utilization to a user responsive to an interaction by the user with a respective port of the one or more ports.

Example 8. The method of example 2, wherein generating the fiber distribution hub display includes: detecting, by the one or more processors, a model of the fiber distribution hub; and generating, by the one or more processors, the fiber distribution hub display such that the fiber distribution hub display at least partially mimics a physical layout of the fiber distribution hub based on the model.

Example 9. The method of example 1, wherein the fiber distribution record includes at least first global positioning system (GPS) coordinates for premises associated with the fiber distribution hub and second GPS coordinates associated with a fiber distribution terminal.

Example 10. The method of example 1, wherein the port is a first port of the plurality of candidate ports, the another port is a second port of the plurality of candidate ports, and the connected termination unit is a termination unit, the method further comprising: responsive to a detection of a disconnection of the termination unit associated with the fiber distribution hub, automatically updating, by the one or more processors, the fiber distribution record; generating, by the one or more processors and based on the detection of the disconnection of the termination unit, a second indication of the second port; and transmitting, by the one or more processors, the second indication of the second port to at least one of a computing device or a user interface.

Example 11. The method of example 10, further comprising: receiving, by the one or more processors, global positioning system (GPS) data associated with termination units associated with one or more premises; determining, by the one or more processors, one or more available ports of a fiber distribution terminal to which to connect the termination units associated with the one or more premises; detecting, by the one or more processors, that at least one of the one or more available ports has been newly physically connected to the termination units, the at least one of the one or more available ports including at least one connected port associated with the one or more premises; and generating, by the one or more processors and based on the at least one connected port associated with the one or more premises, the fiber distribution record.

Example 12. The method of example 11, wherein determining the at least one connected port includes: monitoring, by the one or more processors, activity between the termination units and an optical line terminal associated with the fiber distribution hub; determining, by the one or more processors, the at least one connected port based on the activity between the termination units and the optical line terminal.

Example 13. The method of example 10, wherein the plurality of candidate ports includes at least one of: (i) a third port that lacks a physical connection to one or more alternate termination units or (ii) a fourth port that has the physical connection to the one or more alternate termination units and is indicated by the fiber distribution record as not being utilized.

Example 14. The method of example 10, further comprising: generating, by the one or more processors, the indication of the second port based at least on at least one of: (i) a time of each port spent without a respective connection to one or more termination units, (ii) respective proximities of termination units associated with physically proximate ports, or (iii) GPS coordinates of a user device associated with a user who is connecting the termination unit to the fiber distribution hub.

Example 15. The method of example 1, wherein the connected termination unit is associated with at least one of: (i) a residential premises, (ii) a business premises, or (iii) a multi-dwelling premises.

Example 16. A system configured to track fiber port availability in a fiber distribution hub, the system comprising: one or more processors; and a memory storing one or more instructions that, when executed by the one or more processors, cause the one or more processors to: determine that a connected termination unit associated with a fiber distribution hub uses more than a predetermined threshold value of bandwidth, the connected termination unit having an association with a port of a plurality of candidate ports included in the fiber distribution hub; responsive to determining that the connection termination unit uses more than the predetermined threshold value of bandwidth, transmit an indication to transfer the connected termination unit to another port of the plurality of candidate ports; and update a fiber distribution record representative of port availability in the fiber distribution hub to indicate an updated association between the connected termination unit and the another port.

Example 17. The system of example 16, wherein the memory stores further instructions that, when executed, cause the one or more processors to: generate a fiber distribution hub display representative of the fiber distribution record; and display the fiber distribution hub display to a user.

Example 18. The system of example 17, wherein the update of the fiber distribution record includes: an update of the fiber distribution hub display based on detecting that the connected termination unit has been transferred to the another port.

Example 19. The system of example 18, wherein the memory stores further instructions that, when executed, cause the one or more processors to: detect one or more changes in availability for one or more ports of the fiber distribution hub in real time; wherein updating the fiber distribution hub display includes presenting the one or more changes in availability responsive to detecting the one or more changes in availability.

Example 20. The system of example 17, wherein generating the fiber distribution hub display includes: generating a respective representation for each port of a plurality of ports associated with the fiber distribution hub, wherein the respective representation for the each port is color-coded according to an availability of the each port.

Example 21. The system of example 20, wherein the memory stores further instructions that, when executed, cause the one or more processors to: calculate a respective utilization metric associated with at least one port of the plurality of ports associated with the fiber distribution hub; and display the respective utilization metric to the user responsive to an interaction by the user with the at least one port.

Example 22. The system of example 16, wherein the memory stores further instructions that, when executed, cause the one or more processors to: generate a bandwidth utilization associated with a particular splitter channel, the particular splitter channel comprising one or more ports of a plurality of ports associated with the fiber distribution hub; and display the bandwidth utilization to a user responsive to an interaction by the user with a respective port of the one or more ports.

Example 23. The system of example 17, wherein generating the fiber distribution hub display includes: detect a model of the fiber distribution hub; and generate the fiber distribution hub display such that the fiber distribution hub display at least partially mimics a physical layout of the fiber distribution hub based on the model.

Example 24. The system of example 16, wherein the fiber distribution record includes at least first global positioning system (GPS) coordinates for premises associated with the fiber distribution hub and second GPS coordinates associated with a fiber distribution terminal.

Example 25. The system of example 16, wherein the port is a first port of the plurality of candidate ports, the another port is a second port of the plurality of candidate ports, the connected termination unit is a termination unit, and the memory stores further instructions that, when executed, cause the one or more processors to: responsive to a detection of a disconnection of the termination unit associated with the fiber distribution hub, automatically update the fiber distribution record; generate, based on the detection of the disconnection of the termination unit, a second indication of the second port; and transmit the second indication of the second port to at least one of a computing device or a user interface.

Example 26. The system of example 25, wherein the memory stores further instructions that, when executed, cause the one or more processors to: receive global positioning system (GPS) data associated with termination units associated with one or more premises; determine one or more available ports of a fiber distribution terminal to which to connect the termination units associated with the one or more premises; detect that at least one of the one or more available ports has been newly physically connected to the termination units, the at least one of the one or more available ports including at least one connected port associated with the one or more premises; and generate, based on the at least one connected port associated with the one or more premises, the fiber distribution record.

Example 27. The system of example 26, wherein determining the at least one connected port includes: monitoring activity between the termination units and an optical line terminal associated with the fiber distribution hub; determining the at least one connected port based on the activity between the termination units and the optical line terminal.

Example 28. The system of example 26, wherein the plurality of candidate ports includes at least one of: (i) a third port that lacks a physical connection to one or more alternate termination units or (ii) a fourth port that has the physical connection to the one or more alternate termination units and is indicated by the fiber distribution record as not being utilized.

Example 29. The system of example 26, wherein the memory stores further instructions that, when executed, cause the one or more processors to: generate the indication of the second port based at least on at least one of: (i) a time of each port spent without a respective connection to one or more termination units, (ii) respective proximities of termination units associated with physically proximate ports, or (iii) GPS coordinates of a user device associated with a user who is connecting the termination unit to the fiber distribution hub.

Example 30. The system of example 16, wherein the connected termination unit is associated with at least one of: (i) a residential premises, (ii) a business premises, or (iii) a multi-dwelling premises.

Example 31. Any one of the above examples in combination with any other one or more other of the above examples.

Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112 (f) unless traditional means-plus-function language is expressly recited, such as "means for" or "step for" language being explicitly recited in the claim(s). The systems and methods described herein are directed to an improvement to computer functionality, and improve the functioning of conventional computers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method of tracking fiber port availability in a fiber distribution hub, the method comprising:
   measuring, by one or more processors, port bandwidth utilizations of at least some of a plurality of candidate ports included in a fiber distribution hub of a passive optical network (PON);
   determining, by the one or more processors, that a connected termination unit associated with the fiber distribution hub uses more than a predetermined threshold value of bandwidth, the connected termination unit having an association with a port of a plurality of candidate ports included in the fiber distribution hub;
   determining, by the one or more processors, another port of the plurality of candidate ports to which to transfer the connected termination unit based on the measured port bandwidth utilizations;
   responsive to the determining the another port, transmitting, by the one or more processors, an indication to transfer the connected termination unit to the another port of the plurality of candidate ports; and
   updating, by the one or more processors, a fiber distribution record representative of port availability in the fiber distribution hub to indicate an updated association between the connected termination unit and the another port.

2. The method of claim 1, further comprising:
generating, by the one or more processors, a fiber distribution hub display representative of the fiber distribution record; and
displaying, by the one or more processors, the fiber distribution hub display to a user.

3. The method of claim 2, wherein updating the fiber distribution record includes:
updating, by the one or more processors, the fiber distribution hub display responsive to detecting that the connected termination unit has been transferred to the another port.

4. The method of claim 3, further comprising:
detecting, by the one or more processors, one or more changes in availability for one or more ports of the fiber distribution hub in real time;
wherein the updating the fiber distribution hub display includes presenting the one or more changes in availability responsive to the detecting the one or more changes in availability.

5. The method of claim 2, wherein generating the fiber distribution hub display includes:
generating, by the one or more processors, a respective representation for each port of a plurality of ports associated with the fiber distribution hub, wherein the respective representation for the each port is color-coded according to an availability of the each port.

6. The method of claim 5, further comprising:
calculating, by the one or more processors, a respective utilization metric associated with at least one port of the plurality of ports associated with the fiber distribution hub; and
displaying, by the one or more processors, the respective utilization metric to the user responsive to an interaction by the user with the at least one port.

7. The method of claim 1, further comprising:
generating, by the one or more processors, a bandwidth utilization associated with a particular splitter channel, the particular splitter channel comprising one or more ports of a plurality of ports associated with the fiber distribution hub; and
displaying, by the one or more processors, the bandwidth utilization to a user responsive to an interaction by the user with a respective port of the one or more ports.

8. The method of claim 2, wherein generating the fiber distribution hub display includes:
detecting, by the one or more processors, a model of the fiber distribution hub; and
generating, by the one or more processors, the fiber distribution hub display such that the fiber distribution hub display at least partially mimics a physical layout of the fiber distribution hub based on the model.

9. The method of claim 1, wherein the fiber distribution record includes at least first global positioning system (GPS) coordinates for premises associated with the fiber distribution hub and second GPS coordinates associated with a fiber distribution terminal.

10. The method of claim 1, wherein the port is a first port of the plurality of candidate ports, the another port is a second port of the plurality of candidate ports, and the connected termination unit is a termination unit, the method further comprising:
responsive to a detection of a disconnection of the termination unit associated with the fiber distribution hub, automatically updating, by the one or more processors, the fiber distribution record;
generating, by the one or more processors and based on the detection of the disconnection of the termination unit, a second indication of the second port; and
transmitting, by the one or more processors, the second indication of the second port to at least one of a computing device or a user interface.

11. The method of claim 10, further comprising:
receiving, by the one or more processors, global positioning system (GPS) data associated with termination units associated with one or more premises;
determining, by the one or more processors, one or more available ports of a fiber distribution terminal to which to connect the termination units associated with the one or more premises;
detecting, by the one or more processors, that at least one of the one or more available ports has been newly physically connected to the termination units, the at least one of the one or more available ports including at least one connected port associated with the one or more premises; and
generating, by the one or more processors and based on the at least one connected port associated with the one or more premises, the fiber distribution record.

12. The method of claim 11, wherein determining the at least one connected port includes:
monitoring, by the one or more processors, activity between the termination units and an optical line terminal associated with the fiber distribution hub;
determining, by the one or more processors, the at least one connected port based on the activity between the termination units and the optical line terminal.

13. The method of claim 10, wherein the plurality of candidate ports includes at least one of: (i) a third port that lacks a physical connection to one or more alternate termination units or (ii) a fourth port that has the physical connection to the one or more alternate termination units and is indicated by the fiber distribution record as not being utilized.

14. The method of claim 10, further comprising:
generating, by the one or more processors, the indication of the second port based at least on at least one of: (i) a time of each port spent without a respective connection to one or more termination units, (ii) respective proximities of termination units associated with physically proximate ports, or (iii) GPS coordinates of a user device associated with a user who is connecting the termination unit to the fiber distribution hub.

15. The method of claim 1, wherein the connected termination unit is associated with at least one of: (i) a residential premises, (ii) a business premises, or (iii) a multi-dwelling premises.

16. A system configured to track fiber port availability in a fiber distribution hub, the system comprising:
one or more processors; and
a memory storing one or more instructions that, when executed by the one or more processors, cause the one or more processors to:
measure port bandwidth utilizations of at least some of a plurality of candidate ports included in a fiber distribution hub of a passive optical network (PON);
determine that a connected termination unit associated with the fiber distribution hub uses more than a predetermined threshold value of bandwidth, the connected termination unit having an association with a port of a plurality of candidate ports included in the fiber distribution hub;

determine another port of the plurality of candidate ports to which to transfer the connected termination unit based on the measured port bandwidth utilizations;

responsive to determining the another port, transmit an indication to transfer the connected termination unit to the another port of the plurality of candidate ports; and update a fiber distribution record representative of port availability in the fiber distribution hub to indicate an updated association between the connected termination unit and the another port.

17. The system of claim 16, wherein the memory stores further instructions that, when executed, cause the one or more processors to:

generate a fiber distribution hub display representative of the fiber distribution record; and display the fiber distribution hub display to a user.

18. The system of claim 17, wherein the update of the fiber distribution record includes:

an update of the fiber distribution hub display based on detecting that the connected termination unit has been transferred to the another port.

19. The system of claim 18, wherein the memory stores further instructions that, when executed, cause the one or more processors to:

detect one or more changes in availability for one or more ports of the fiber distribution hub in real time;

wherein updating the fiber distribution hub display includes presenting the one or more changes in availability responsive to detecting the one or more changes in availability.

20. The system of claim 17, wherein generating the fiber distribution hub display includes:

generating a respective representation for each port of a plurality of ports associated with the fiber distribution hub, wherein the respective representation for the each port is color-coded according to an availability of the each port.

21. The system of claim 20, wherein the memory stores further instructions that, when executed, cause the one or more processors to:

calculate a respective utilization metric associated with at least one port of the plurality of ports associated with the fiber distribution hub; and display the respective utilization metric to the user responsive to an interaction by the user with the at least one port.

22. The system of claim 16, wherein the memory stores further instructions that, when executed, cause the one or more processors to:

generate a bandwidth utilization associated with a particular splitter channel, the particular splitter channel comprising one or more ports of a plurality of ports associated with the fiber distribution hub; and display the bandwidth utilization to a user responsive to an interaction by the user with a respective port of the one or more ports.

23. The system of claim 17, wherein generating the fiber distribution hub display includes:

detect a model of the fiber distribution hub; and generate the fiber distribution hub display such that the fiber distribution hub display at least partially mimics a physical layout of the fiber distribution hub based on the model.

24. The system of claim 16, wherein the fiber distribution record includes at least first global positioning system (GPS) coordinates for premises associated with the fiber distribution hub and second GPS coordinates associated with a fiber distribution terminal.

25. The system of claim 16, wherein the port is a first port of the plurality of candidate ports, the another port is a second port of the plurality of candidate ports, the connected termination unit is a termination unit, and the memory stores further instructions that, when executed, cause the one or more processors to:

responsive to a detection of a disconnection of the termination unit associated with the fiber distribution hub, automatically update the fiber distribution record;

generate, based on the detection of the disconnection of the termination unit, a second indication of the second port; and transmit the second indication of the second port to at least one of a computing device or a user interface.

26. The system of claim 25, wherein the memory stores further instructions that, when executed, cause the one or more processors to:

receive global positioning system (GPS) data associated with termination units associated with one or more premises;

determine one or more available ports of a fiber distribution terminal to which to connect the termination units associated with the one or more premises;

detect that at least one of the one or more available ports has been newly physically connected to the termination units, the at least one of the one or more available ports including at least one connected port associated with the one or more premises; and generate, based on the at least one connected port associated with the one or more premises, the fiber distribution record.

27. The system of claim 26, wherein determining the at least one connected port includes:

monitoring activity between the termination units and an optical line terminal associated with the fiber distribution hub;

determining the at least one connected port based on the activity between the termination units and the optical line terminal.

28. The system of claim 26, wherein the plurality of candidate ports includes at least one of: (i) a third port that lacks a physical connection to one or more alternate termination units or (ii) a fourth port that has the physical connection to the one or more alternate termination units and is indicated by the fiber distribution record as not being utilized.

29. The system of claim 26, wherein the memory stores further instructions that, when executed, cause the one or more processors to:

generate the indication of the second port based at least on at least one of: (i) a time of each port spent without a respective connection to one or more termination units, (ii) respective proximities of termination units associated with physically proximate ports, or (iii) GPS coordinates of a user device associated with a user who is connecting the termination unit to the fiber distribution hub.

30. The system of claim 16, wherein the connected termination unit is associated with at least one of: (i) a residential premises, (ii) a business premises, or (iii) a multi-dwelling premises.

* * * * *